UNITED STATES PATENT OFFICE 1,954,706

PROCESS OF MANUFACTURING AMINO-ARYLTHIOGLYCOLLIC ACIDS

Herbert A. Lubs and John E. Cole, Wilmington, Del., assignors to E. I. du Pont de Nemours & Company, Wilmington, Del., a corporation of Delaware No Drawing. Application August 30, 1930, Serial No. 479,097

17 Claims. (Cl. 260—108)

This invention relates to the manufacture of o-amino arylthioglycollic acids which are valuable intermediates for the manufacture of thioindigoid dyes. The previously known methods, such as those illustrated in German Patent 364,822 and British Patent 279,489, are relatively expensive and commercially difficult to control.

Our invention has for an object the synthesis of o-amino arylthioglycollic acids by a process which is inexpensive, easily controlled, and which results in improved yields of a much purer product than it has been possible heretofore to attain. Other objects will appear as our description proceeds.

These objects are attained by our process which, in its simplest aspect, consists in the hydrolysis of aryl mercapto thiazoles by caustic alkalis and the condensation of the resultant products with chloracetic acid. The reactions which occur may be illustrated as follows:

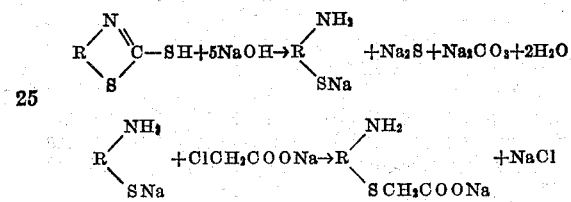

In the above formula R may be an aryl residue, such as a benzene or naphthalene nucleus, which may be substituted or unsubstituted as, for example, with alkyl, alkoxy, or aralkyl substituents.

By way of illustrating our process, we give the following examples:

Example I 20 grams 3-methyl benzo mercapto thiazole,

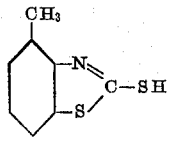

are mixed with 80 g. NaOH and 140 g. water and heated in a suitable closed vessel at a temperature of about 190° C. for eight hours. The mixture is then diluted with water, acidified, warmed and filtered. The filtrate is then cooled, made alkaline and 15 g. sodium chloracetate added. The mass is then warmed for about one hour at 50°. The solution thus obtained can be used directly for further transformations, or the anhydride,

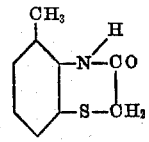

isolated by acidification and warming the solution.

Example II

By the use of benzo mercapto thiazole and proceeding as described in Example I, 2-amino phenylthioglycollic acid is obtained in the form of its anhydride.

Example III 20 g. 5 ethoxy benzomercaptothiazole

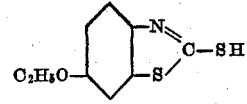

are heated with 100 g. caustic soda and 100 g. of alcohol for six hours at 180°. After removal of the alcohol by distillation the reaction product is worked up as described in Example I. There is thus obtained the anhydride of 2-amino-5-ethoxy phenylthioglycollic acid,

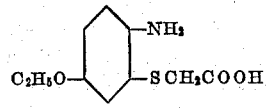

It is to be understood that the precise reagents and quantities thereof, as well as conditions of operation given in the above examples, are merely by way of illustration and that we contemplate modifications thereof as being within the scope of our invention. Thus, although we have illustrated in the examples the use of the simpler mercapto benzo thiazoles, it is to be understood that we may use mercapto naphtho thiazoles both substituted and unsubstituted. Other and obvious modifications will readily appear to one skilled in the art.

Since many embodiments of this invention, differing widely in one or more respects, may be made without departing from the spirit of our invention, it is to be understood that we do not limit ourselves to the foregoing examples or description except as indicated in the following claims:

We claim:

1. A process of manufacturing 2-amino-3-methyl phenylthioglycollic acid, which comprises hydrolyzing 3-methyl benzo mercapto thiazole with a caustic alkali solution at about 190° C., and subsequently condensing the reaction product with chloracetic acid.

2. A process of manufacturing 2-amino-5-ethoxy phenylthioglycollic acid, which comprises hydrolyzing 5-ethoxy benzo mercapto thiazole with a caustic alkali solution at about 180° C., and subsequently condensing the reaction product with chloracetic acid.

3. A process for manufacturing an o-amino-arylthioglycollic acid, which comprises hydrolyzing a compound of the type:

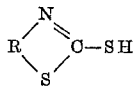

in which R is an alkyl or alkoxy substituted benzene or naphthalene nucleus, adjacent carbon atoms of which are attached to the nitrogen and sulfur atoms, in the presence of a caustic alkali solution at about 180° C. to about 190° C., and subsequently condensing the reaction product with chloracetic acid.

4. A process for manufacturing an o-amino-arylthioglycollic acid, which comprises hydrolyzing a mercapto arylthiazole, having an alkoxy group substituted in the aryl nucleus, in the presence of a caustic alkali solution at about 180° C., and subsequently condensing the reaction product with chloracetic acid.

5. A process for manufacturing an o-amino-phenylthioglycollic acid, which comprises hydrolyzing a mercapto benzo thiazole, having an alkoxy group substituted in the benzene nucleus, with a caustic alkali solution at about 180° C., and subsequently condensing the reaction product with chloracetic acid.

6. In a process, the step which comprises hydrolyzing a compound of the type:

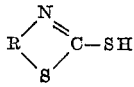

in which R is an alkyl or alkoxy substituted benzene or naphthalene nucleus, adjacent carbon atoms of which are attached to the nitrogen and sulfur atoms, in the presence of a caustic alkali solution at about 180° C. to about 190° C.

7. In a process, the step which comprises hydrolyzing a mercapto arylthiazole, having an alkoxy group substituted in the aryl nucleus, in the presence of a caustic alkali solution at about 180° C.

8. In a process, the step which comprises hydrolyzing a mercapto benzo thiazole, having an alkoxy group substituted in the benzene nucleus, with a caustic alkali solution at about 180° C.

9. In a process, the step which comprises hydrolyzing 3-methyl benzo mercapto thiazole with a caustic alkali solution at about 190° C.

10. In a process, the step which comprises hydrolyzing 5-ethoxy benzo mercapto thiazole with a caustic alkali solution at about 180° C.

11. In a process, the step which comprises hydrolyzing 3-methyl benzo mercapto thiazole with an aqueous caustic alkali solution, containing about 80 grams of caustic to each 140 grams of water, at about 190° C.

12. In a process, the step which comprises hydrolyzing 5-ethoxy benzo mercapto thiazole with an alcoholic caustic alkali solution, comprising about 100 grams of caustic soda for each 100 grams of alcohol, at about 180° C.

13. A process of manufacturing an o-amino-arylthioglycollic acid which comprises hydrolyzing a mercapto aryl thiazole in the presence of a caustic alkali solution at a temperature of about 180° C. to about 190° C., and subsequently condensing the reaction product with chloracetic acid.

14. A process of manufacturing an o-amino-arylthioglycollic acid which comprises hydrolyzing a mercapto aryl thiazole having an alkyl group substituted in the aryl nucleus, in the presence of a caustic alkali solution at about 190° C., and subsequently condensing the reaction product with chloracetic acid.

15. A process of manufacturing an o-amino-phenylthioglycollic acid which comprises hydrolyzing a mercapto benzo thiazole having an alkyl group substituted in the benzene nucleus, with a caustic alkali solution at about 190° C., and subsequently condensing the reaction product with chloracetic acid.

16. In a process, the step which comprises hydrolyzing a mercapto aryl thiazole having an alkyl group substituted in the aryl nucleus, in the presence of a caustic alkali solution at about 190° C.

17. In a process, the step which comprises hydrolyzing a mercapto benzo thiazole having an alkyl group substituted in the benzene nucleus, with a caustic alkali solution at about 190° C.

HERBERT A. LUBS.
JOHN E. COLE.